United States Patent
Shin et al.

(10) Patent No.: US 10,563,759 B1
(45) Date of Patent: Feb. 18, 2020

(54) HYDRAULIC CONTROL APPARATUS OF SHIFT CONTROL UNIT FOR DUAL CLUTCH TRANSMISSION

(71) Applicants: Hyundai Motor Company, Seoul (KR); Kia Motors Corporation, Seoul (KR)

(72) Inventors: Yong Uk Shin, Suwon-si (KR); Minho Chae, Incheon (KR); Chon Ok Kim, Yongin-si (KR); Sun Sung Kwon, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/162,937

(22) Filed: Oct. 17, 2018

(30) Foreign Application Priority Data

Jul. 30, 2018 (KR) .......................... 10-2018-0088607

(51) Int. Cl.
| | |
|---|---|
| *F16H 61/28* | (2006.01) |
| *F16H 61/00* | (2006.01) |
| *F16H 61/02* | (2006.01) |
| *F16H 61/68* | (2006.01) |
| *F16H 61/688* | (2006.01) |
| *F16H 3/00* | (2006.01) |

(52) U.S. Cl.
CPC ......... *F16H 61/2807* (2013.01); *F16H 3/006* (2013.01); *F16H 61/0021* (2013.01); *F16H 61/0206* (2013.01); *F16H 61/688* (2013.01)

(58) Field of Classification Search
None
See application file for complete search history.

(56) References Cited

U.S. PATENT DOCUMENTS

| | | | |
|---|---|---|---|
| 6,874,381 B2 | 4/2005 | Berger et al. | |
| 8,206,265 B2 * | 6/2012 | Maten | F16H 61/2807 |
| | | | 192/3.61 |
| 8,413,777 B2 * | 4/2013 | Lundberg | F16H 61/0206 |
| | | | 192/3.58 |
| 8,434,603 B2 * | 5/2013 | Lundberg | F16H 61/0021 |
| | | | 192/3.58 |

(Continued)

FOREIGN PATENT DOCUMENTS

KR  10-0534802 B1  12/2005

*Primary Examiner* — Colby M Hansen
(74) *Attorney, Agent, or Firm* — Morgan, Lewis & Bockius LLP

(57) ABSTRACT

A hydraulic control apparatus may include a first valve bifurcating hydraulic pressures of two pressure control solenoid valves, a second valve selectively supplying one pressure from the first valve to first chambers of first and second actuators and another hydraulic pressure from the first valve to second chambers of first and second actuators, a third valve bifurcating hydraulic pressure from the first valve, a fourth valve selectively supplying one pressure from the third valve to first chambers of third and fourth actuators and selectively supplying another pressure from the third valve to second chambers of third and fourth actuators, and a fifth valve selectively supplying one pressure from the third valve to a first chamber of a fifth actuator and an exhaust port and selectively supplying another pressure from the third valve to a second chamber of the fifth actuator and the exhaust port.

21 Claims, 4 Drawing Sheets

(56) References Cited

U.S. PATENT DOCUMENTS

| | | | |
|---|---|---|---|
| 8,475,336 B2 | 7/2013 | Whitmarsh et al. | |
| 8,752,444 B2 * | 6/2014 | Garabello | F16H 61/12 |
| | | | 192/3.54 |
| 8,874,333 B2 * | 10/2014 | Harada | F16H 3/006 |
| | | | 701/55 |
| 2016/0017987 A1 * | 1/2016 | Yoshimura | F16H 61/12 |
| | | | 701/63 |

* cited by examiner

HYDRAULIC CONTROL APPARATUS OF SHIFT CONTROL UNIT FOR DUAL CLUTCH TRANSMISSION

CROSS-REFERENCE TO RELATED APPLICATION

The present application claims priority to Korean Patent Application No. 10-2018-0088607 filed on Jul. 30, 2018, the entire contents of which is incorporated herein for all purposes by this reference.

BACKGROUND OF THE INVENTION

Field of the Invention

The present invention relates to a hydraulic control apparatus of a shift control unit for a dual clutch transmission.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

The double clutch transmission (DCT) includes two clutches devices and a gear train of a basically manual transmission, selectively transmits a torque input from an engine to two input shafts by use of the two clutches devices, and outputs a torque shifted by the gear train.

Such a double clutch transmission (DCT) attempts to compactly realize a multi-stage transmission of more than five speeds. The DCT achieves an automated manual transmission (AMT) that removes the inconvenience of a manual shifting of a driver, by controlling two clutches and synchronizers by a controller.

In comparison with an automatic transmission using planetary gears, such a DCT shows merits, such as higher efficiency in power delivery, easier modification in revising or adding parts to achieve more shifting stages, etc., and thus gathers more spotlight since it can more comfortably conform with fuel consumption regulation and efficiency in achieving more shifting stages.

Furthermore, the DCT is becoming to have as many as of eight or nine speeds, and hydraulic control apparatus to effectively control the DCT plays an important role in enhancement of fuel consumption and high performance.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing hydraulic control apparatus of a shift control unit for a dual clutch transmission having advantages of reducing the number of employed shift valves and reducing a production cost.

An exemplary hydraulic control apparatus may include first and second pressure control solenoid valves and first, second, third, fourth, and fifth shift valves. The first pressure control solenoid valve variably controls a line pressure and outputs the controlled pressure through a first discharge hydraulic line. The second pressure control solenoid valve variably controls the line pressure and outputs the controlled pressure through a second discharge hydraulic line. The first shift valve converts hydraulic communication to supply the hydraulic pressures of the first and second pressure control solenoid valves received through the first and second discharge hydraulic lines to downstream sides, each through two paths. The second shift valve converts hydraulic communication to selectively supply the hydraulic pressure of the first pressure control solenoid valve received from the first shift valve to a first chamber of a first actuator and a first chamber of a second actuator, and to selectively supply the hydraulic pressure of the second pressure control solenoid valve received from the first shift valve to a second chamber of the first actuator and a second chamber of the second actuator. The third shift valve converts hydraulic communication to supply the hydraulic pressure of the first and second pressure control solenoid valves received from the first shift valve to downstream sides, each through two paths. The fourth shift valve converts hydraulic communication to selectively supply hydraulic pressure of the first pressure control solenoid valve received from the third shift valve to a first chamber of a third actuator and a first chamber of a fourth actuator, and to selectively supply hydraulic pressure of the second pressure control solenoid valve received from the third shift valve to a second chamber of the third actuator and a second chamber of the fourth actuator. The fifth shift valve converts hydraulic communication to selectively supply hydraulic pressure of the first pressure control solenoid valve received from the third shift valve to a first chamber of a fifth actuator and an exhaust port, and to selectively supply hydraulic pressure of the second pressure control solenoid valve received from the third shift valve to a second chamber of the fifth actuator and the exhaust port. The first, second, third, fourth, and fifth shift valves may be controlled by at least three solenoid valves each controlling hydraulic pressure received from a reducing valve that controls stably converts the line pressure to a hydraulic pressure lower than the line pressure.

The at least three solenoid valves may include a first solenoid valve controlling the first shift valve, a second solenoid valve controlling the second shift valve, a third solenoid valve controlling the third shift valve, and a fourth solenoid valve simultaneously controlling the fourth and fifth shift valves.

The first, second, and third actuators may control odd-numbered shifting stages and reverse speed. The fourth and fifth actuators may control even-numbered shifting stages.

The first actuator may include first and second chambers for the seventh speed and the fifth speed. The second actuator may include first and second chambers for the third speed and the first speed. The third actuator may include first and second chambers for the ninth forward speed and the reverse speed. The fourth actuator may include first and second chambers for the eighth speed and the sixth speed. The fifth actuator may include first and second chambers for the second speed and the fourth speed.

A fail-safe mode driving may be realized by controlling the third, fourth, and fifth actuators in the case of a failure of the first solenoid valve or the second solenoid valve. A fail-safe mode driving may be realized by controlling the first and second actuators in the case of a failure of the third solenoid valve or fourth solenoid valve.

The first shift valve may be formed as a spool valve having a valve body and a valve spool disposed in the valve body, and may convert hydraulic communication by being controlled by an elastic force of an elastic member and a control pressure of the first solenoid valve applied to an opposite side of the elastic member.

The valve body of the first shift valve may include a first port receiving the hydraulic pressure of the first solenoid valve, a second port receiving the hydraulic pressure of the first discharge hydraulic line, a third port selectively supplying the hydraulic pressure of the second port to the first group first hydraulic line, a fourth port selectively supplying the hydraulic pressure of the second port to the second group first hydraulic line, a fifth port receiving the hydraulic pressure of the second discharge hydraulic line, a sixth port selectively supplying the hydraulic pressure of the fifth port to the first group second hydraulic line, a seventh port selectively supplying the hydraulic pressure of the fifth port to the second group second hydraulic line, and three exhaust ports exhausting the hydraulic pressure received through the third, fourth, sixth, and seventh ports. The valve spool of the first shift valve may include a first land selectively connecting the second port and the third port, a second land selectively connecting the second port and the fourth port in cooperation with the first land, a third land selectively connecting the fifth port and the sixth port, a fourth land selectively connecting the second port and the seventh port in cooperation with the third land, and a fifth land applied with a control pressure of the first solenoid valve. The elastic member may be disposed between the first land and the valve body.

The second shift valve may be formed as a spool valve having a valve body and a valve spool disposed in the valve body, and may convert hydraulic communication by being controlled by an elastic force of an elastic member and a control pressure of the second solenoid valve applied to an opposite side of the elastic member.

The valve body of the second shift valve may include a first port receiving the hydraulic pressure of the second solenoid valve, a second port receiving the hydraulic pressure of the first group first hydraulic line, a third port selectively supplying the hydraulic pressure of the second port to the first group third hydraulic line, a fourth port selectively supplying the hydraulic pressure of the second port to the first group fourth hydraulic line, a fifth port receiving the hydraulic pressure of the first group second hydraulic line, a sixth port selectively supplying the hydraulic pressure of the fifth port to the first group fifth hydraulic line, a seventh port selectively supplying the hydraulic pressure of the fifth port to the first group sixth hydraulic line, and three exhaust ports exhausting the hydraulic pressure received through the third, fourth, sixth, and seventh ports. The valve spool of the second shift valve may include a first land selectively connecting the second port and the third port, a second land selectively connecting the second port and the fourth port in cooperation with the first land, a third land selectively connecting the fifth port and the sixth port, a fourth land selectively connecting the second port and the seventh port in cooperation with the third land, and a fifth land applied with a control pressure of the second solenoid valve. The elastic member may be disposed between the first land and the valve body.

The third shift valve may be formed as a spool valve having a valve body and a valve spool disposed in the valve body, and may convert hydraulic communication by being controlled by an elastic force of an elastic member and a control pressure of the third solenoid valve applied to an opposite side of the elastic member.

The valve body of the third shift valve may include a first port receiving the hydraulic pressure of the third solenoid valve, a second port receiving the hydraulic pressure of the second group first hydraulic line, a third port selectively supplying the hydraulic pressure of the second port to the second group third hydraulic line, a fourth port selectively supplying the hydraulic pressure of the second port to the second group fourth hydraulic line, a fifth port receiving the hydraulic pressure of the second group second hydraulic line, a sixth port selectively supplying the hydraulic pressure of the fifth port to the second group fifth hydraulic line, a seventh port selectively supplying the hydraulic pressure of the fifth port to the second group sixth hydraulic line, and three exhaust ports exhausting the hydraulic pressure received through the third, fourth, sixth, and seventh ports. The valve spool of the third shift valve may include a first land selectively connecting the second port and the third port, a second land selectively connecting the second port and the fourth port in cooperation with the first land, a third land selectively connecting the fifth port and the sixth port, a fourth land selectively connecting the second port and the seventh port in cooperation with the third land, and a fifth land applied with a control pressure of the third solenoid valve. The elastic member may be disposed between the first land and the valve body.

The fourth shift valve may be formed as a spool valve having a valve body and a valve spool disposed in the valve body, and may convert hydraulic communication by being controlled by an elastic force of an elastic member and a control pressure of the fourth solenoid valve applied to an opposite side of the elastic member.

The valve body of the fourth shift valve may include a first port receiving the hydraulic pressure of the fourth solenoid valve, a second port receiving the hydraulic pressure of the second group third hydraulic line, a third port selectively supplying the hydraulic pressure of the second port to the second group seventh hydraulic line, a fourth port selectively supplying the hydraulic pressure of the second port to the second group eighth hydraulic line, a fifth port receiving the hydraulic pressure of the second group fifth hydraulic line, a sixth port selectively supplying the hydraulic pressure of the fifth port to the second group ninth hydraulic line, a seventh port selectively supplying the hydraulic pressure of the fifth port to the second group tenth hydraulic line, and three exhaust ports exhausting the hydraulic pressure received through the third, fourth, sixth, and seventh ports. The valve spool of the fourth shift valve may include a first land selectively connecting the second port and the third port, a second land selectively connecting the second port and the fourth port in cooperation with the first land, a third land selectively connecting the fifth port and the sixth port, a fourth land selectively connecting the second port and the seventh port in cooperation with the third land, and a fifth land applied with a control pressure of the fourth solenoid valve. The elastic member may be disposed between the first land and the valve body.

The fifth shift valve may be formed as a spool valve having a valve body and a valve spool disposed in the valve body, and may convert hydraulic communication by being controlled by an elastic force of an elastic member and a control pressure of the fourth solenoid valve applied to an opposite side of the elastic member.

The valve body of the fifth shift valve may include a first port receiving the hydraulic pressure of the fourth solenoid valve, a second port receiving the hydraulic pressure of the second group fourth hydraulic line, a third port selectively supplying the hydraulic pressure of the second port to the second group eleventh hydraulic line, a fourth port selectively supplying the hydraulic pressure of the second port to the second group twelfth hydraulic line, a fifth port receiving the hydraulic pressure of the second group sixth hydraulic line, a sixth port selectively supplying the hydraulic pressure of the fifth port to the second group thirteenth hydraulic line, a seventh port selectively supplying the hydraulic pressure of the fifth port to the second group fourteenth hydraulic line, and three exhaust ports exhausting the hydraulic pressure received through the third, fourth, sixth, and seventh ports. The valve spool of the fifth shift valve may include a first land selectively connecting the second port and the third port, a second land selectively connecting the second port and the fourth port in cooperation with the first land, a third land selectively connecting the fifth port and the sixth port, a fourth land selectively connecting the second port and the seventh port in cooperation with the third land, and a fifth land applied with a control pressure of the fourth solenoid valve. The elastic member may be disposed between the first land and the valve body.

The at least three solenoid valves may include a first solenoid valve controlling the first shift valve, a second solenoid valve simultaneously controlling the second, fourth, and fifth shift valves, and a third solenoid valve controlling the third shift valve.

The first actuator may include first and second chambers for the third speed and the first speed. The second actuator may include first and second chambers for the second speed and the fourth speed. The third actuator may include first and second chambers for the seventh speed and the fifth speed. The fourth actuator may include first and second chambers for the eighth speed and the sixth speed. The fifth actuator may include first and second chambers for the ninth forward speed and the reverse speed.

In the case of a failure of the first solenoid valve, a low gear driving or a high gear driving may be realized by controlling the first and second actuators or the third, fourth, and fifth actuators. In the case of a failure of the second solenoid valve, driving in the odd-numbered shifting stages or in the even-numbered shifting stages may be realized by controlling the second and fourth actuators or by controlling the first and third actuators. In the case of a failure of the third solenoid valve, driving in the odd-numbered shifting stages or in low and high gears may be realized by controlling the first and second actuators or the first, second, third, and fourth actuators.

The at least three solenoid valves may include a first solenoid valve controlling the first shift valve, a second solenoid valve simultaneously controlling the second, and third shift valves, and a fourth solenoid valve simultaneously controlling the fourth and fifth shift valves.

The first actuator may include first and second chambers for the third speed and the first speed. The second actuator may include first and second chambers for the second speed and the fourth speed. The third actuator may include first and second chambers for the ninth forward speed and the reverse speed. The fourth actuator may include first and second chambers for the eighth speed and the sixth speed. The fifth actuator may include first and second chambers for the seventh speed and the fifth speed.

In the case of a failure of the first solenoid valve, a low gear driving or a high gear driving may be realized by controlling the first and second actuators or the third, fourth, and fifth actuators. In the case of a failure of the second solenoid valve, driving in the odd-numbered shifting stages or in the even-numbered shifting stages may be realized by controlling the second and fifth actuators or the first, third, and fifth actuators. In the case of a failure of the fourth solenoid valve, driving in the odd-numbered shifting stages or in low and high gears may be realized by controlling the first and second actuators or the first, second, third, and fourth actuators.

An exemplary embodiment of the present invention may realize eight or nine forward speeds and one reverse speed by converting hydraulic communication of the first to fifth shift valves by independently controlling the first and second pressure control solenoid valves and the first to fourth solenoid valves.

An exemplary embodiment of the present invention may realize reduction of production cost by employing minimal number of shift valves by commonly utilizing a shift valve in shifting operations.

Furthermore, an exemplary embodiment of the present invention classifies the five actuators into a first group including first and second actuators and a second group including third, fourth, and fifth actuators, where the first and second groups may respectively relate to odd-numbered shifting stages and even-numbered shifting stages, or to low gears and high gears. Therefore, a fail-safe mode driving is available in odd-numbered shifting stages or in even-numbered shifting stages, or alternatively, in low gears or in high gears.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
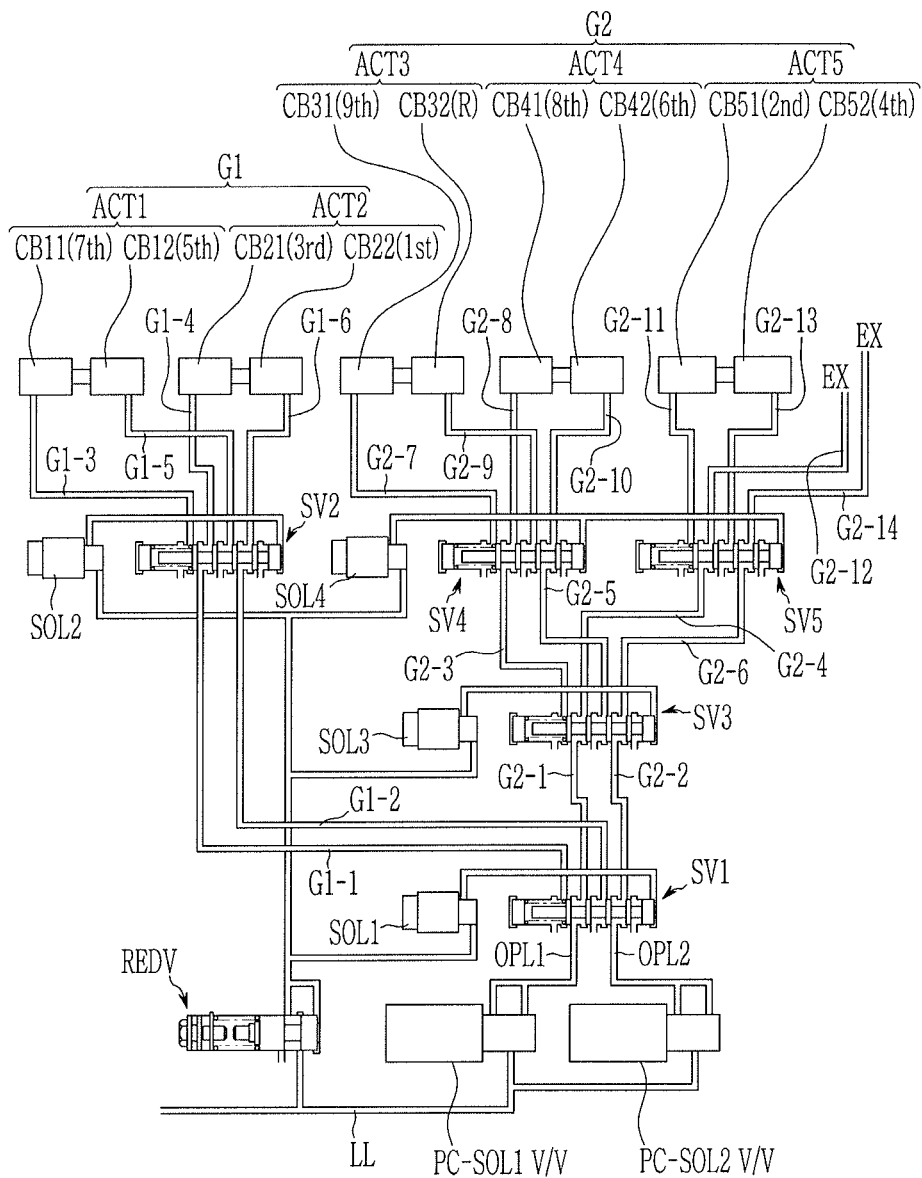
FIG. 1 is a schematic diagram of a hydraulic control apparatus of a shift control unit for a dual clutch transmission according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a hydraulic control apparatus of a shift control unit for a dual clutch transmission according to various exemplary embodiments of the present invention.

Referring to FIG. 1, a hydraulic control apparatus of a shift control unit for a dual clutch transmission according to various exemplary embodiments of the present invention includes first and second pressure control solenoid valves PC-SOL1 V/V and PC-SOL2 V/V, first, second, third, fourth, and fifth shift valves SV1 to SV5, first, second, third, and fourth solenoid valves SOL1 to SOL4, first, second, third, fourth, and fifth actuators ACT1 to ACT5, and a reducing valve REDV.

Transmission fluid is stored in a sump of a transmission and pumped by a hydraulic pump to be supplied to a line pressure hydraulic line LL. The hydraulic pressure of the line pressure hydraulic line LL is stably controlled by a line regulator valve and supplied to the first and second pressure control solenoid valves PC-SOL1 V/V and PC-SOL2 V/V and the reducing valve REDV.

The first and second pressure control solenoid valves PC-SOL1 V/V and PC-SOL2 V/V are formed as variable solenoid valves, for example. According to signals from a transmission control unit, the first and second pressure control solenoid valves PC-SOL1 V/V and PC-SOL2 V/V variably controls the line pressure supplied through the line pressure hydraulic line LL, and supplies the controlled pressure to the first shift valve SV1 respectively through first and second discharge hydraulic lines OPL1 and OPL2.

The first shift valve SV1 selectively supplies the hydraulic pressure received through the first and second discharge hydraulic lines OPL1 and OPL2 to the second shift valve SV2 and the third shift valve SV3. The hydraulic pressure supplied to the second shift valve SV2 is then supplied to the first and second actuators ACT1 and ACT2 that are involved in realizing odd-numbered shifting stages. The hydraulic pressure supplied to the third shift valve SV3 is then supplied to the fourth and fifth actuators ACT4 and ACT5 through the fourth and fifth shift valves SV4 and SV5. By such a hydraulic pressure communication, nine forward speeds and one reverse speed are realized.

The first to fifth actuators ACT1 to ACT5 are respectively a device to reciprocate a shift fork to move a sleeve to engage a corresponding driver or driven gear to a rotation shaft, of which details may be realized as known to a person of ordinary skill.

The first to fifth actuators ACT1 to ACT5 includes first chambers CB11, CB21, CB31, CB41, and CB51 and second chambers CB12, CB22, CB32, CB42, and CB52. Each of the chambers is related to a specific shift-stage, and by applying or exhausting the hydraulic pressure to/from the chamber the corresponding shift-stage is realized or released.

The reducing valve REDV stably controls the hydraulic pressure supplied through the line pressure hydraulic line LL to a pressure lower than a line pressure, and supplies the stabilized pressure to the first to fourth solenoid valves SOL1 to SOL4. The first to fourth solenoid valves SOL1 to SOL4 are on/off solenoid valves, and respectively controls the first to fourth shift valves SV1 to SV4 according to a control of the transmission control unit.

The first shift valve SV1 converts hydraulic communication according to a control of the first solenoid valve SOL1. The first shift valve SV1 selectively supply the hydraulic pressure received through the first discharge hydraulic line OPL1 to a first group first hydraulic line G1-1 or a second group first hydraulic line G2-1. The first shift valve SV1 selectively supply the hydraulic pressure received through the second discharge hydraulic line OPL2 to a first group second hydraulic line G1-2 or a second group second hydraulic line G2-2.

The second shift valve SV2 converts hydraulic communication according to a control of the second solenoid valve SOL2. The second shift valve SV2 selectively supply the hydraulic pressure received through the first group first hydraulic line G1-1 to a first group third hydraulic line G1-3 or a first group fourth hydraulic line G1-4. The second shift valve SV2 selectively supply the hydraulic pressure received through the first group second hydraulic line G1-2 to a first group fifth hydraulic line G1-5 or a first group sixth hydraulic line G1-6.

The first group third hydraulic line G1-3 is connected to the first chamber CB11 of the first actuator ACT1. The first group fourth hydraulic line G1-4 is connected to the first chamber CB21 of the second actuator ACT2. The first group fifth hydraulic line G1-5 is connected to the second chamber CB12 of the first actuator ACT1. The first group sixth hydraulic line G1-6 is connected to the second chamber CB22 of the second actuator ACT2.

FIG. 1 illustrates that the first and second actuators ACT1 and ACT2 are classified as a first group G1, the first and second chambers CB11 and CB12 of the first actuator ACT1 are respectively chambers for the seventh forward speed and the fifth forward speed, and the first and second chambers CB21 and CB22 of the second actuator ACT2 are respectively chambers for the third forward speed and the first forward speed. However, it may be understood that the present invention is limited thereto, since variations may be applied based on design factors.

The third shift valve SV3 converts hydraulic communication according to a control of the third solenoid valve SOL3. The third shift valve SV3 selectively supply the hydraulic pressure received through the second group first hydraulic line G2-1 to a second group third hydraulic line G2-3 or a second group fourth hydraulic line G2-4. The third shift valve SV3 selectively supply the hydraulic pressure received through the second group second hydraulic line G2-2 to a second group fifth hydraulic line G2-5 or a second group sixth hydraulic line G2-6.

The fourth shift valve SV4 converts hydraulic communication according to a control of the fourth solenoid valve SOL4. The fourth shift valve SV4 selectively supply the hydraulic pressure received through the second group third hydraulic line G2-3 to a second group seventh hydraulic line G2-7 or a second group eighth hydraulic line G2-8. The fourth shift valve SV4 selectively supply the hydraulic pressure received through the second group fifth hydraulic line G2-5 to a second group ninth hydraulic line G2-9 or a second group tenth hydraulic line G2-10.

The fifth shift valve SV5 converts hydraulic communication according to a control of the fourth solenoid valve SOL4. The fifth shift valve SV5 selectively supply the hydraulic pressure received through the second group fourth hydraulic line G2-4 to a second group eleventh hydraulic line G2-11 or a second group twelfth hydraulic line G2-12. The fifth shift valve SV5 selectively supply the hydraulic pressure received through the second group sixth hydraulic line G2-6 to a second group thirteenth hydraulic line G2-13 or a second group fourteenth hydraulic line G2-14.

The second group seventh hydraulic line G2-7 is connected to the first chamber CB31 of the third actuator ACT3. The second group eighth hydraulic line G2-8 is connected to the first chamber CB41 of the fourth actuator ACT4. The second group ninth hydraulic line G2-9 is connected to the second chamber CB32 of the third actuator ACT3. The second group tenth hydraulic line G2-10 is connected to the second chamber CB22 of the fourth actuator ACT4.

Furthermore, the second group eleventh hydraulic line G2-11 is connected to the first chamber CB51 of the fifth actuator ACT5. The second group twelfth hydraulic line G2-12 is connected to an exhaust hydraulic line EX. The second group thirteenth hydraulic line G2-13 is connected to the second chamber CB52 of the fifth actuator ACT5. The second group fourteenth hydraulic line G2-14 is connected to the exhaust hydraulic line EX.

Although the second group twelfth and fourteenth hydraulic lines G2-12 and G2-14 have been described to be connected to the exhaust hydraulic line EX, the present invention is not limited thereto. Such arrangement has been employed to prevent the hydraulic pressure of the second group fourth and sixth hydraulic lines G2-4 and G2-6 to affect the fifth actuator ACT5 by operation of the fourth solenoid valve SOL4.

FIG. 1 illustrates that the third, fourth, and fifth actuators ACT3, ACT4, and ACT5 are classified as a second group G2, the first and second chambers CB31 and CB32 of the third actuator ACT3 are respectively chambers for the ninth forward speed and the reverse speed (in the case of eight forward speed transmission, neutral N and the reverse speed R), the first and second chambers CB41 and CB42 of the fourth actuator ACT4 fourth actuator ACT4 the eighth forward speed and the sixth forward speed, and the first and second chambers CB51 and CB52 of the fifth actuator ACT5 fourth actuator ACT4 the second forward speed and the fourth forward speed. However, it may be understood that the present invention is limited thereto, since variations may be applied based on design factors.

Figure 2:
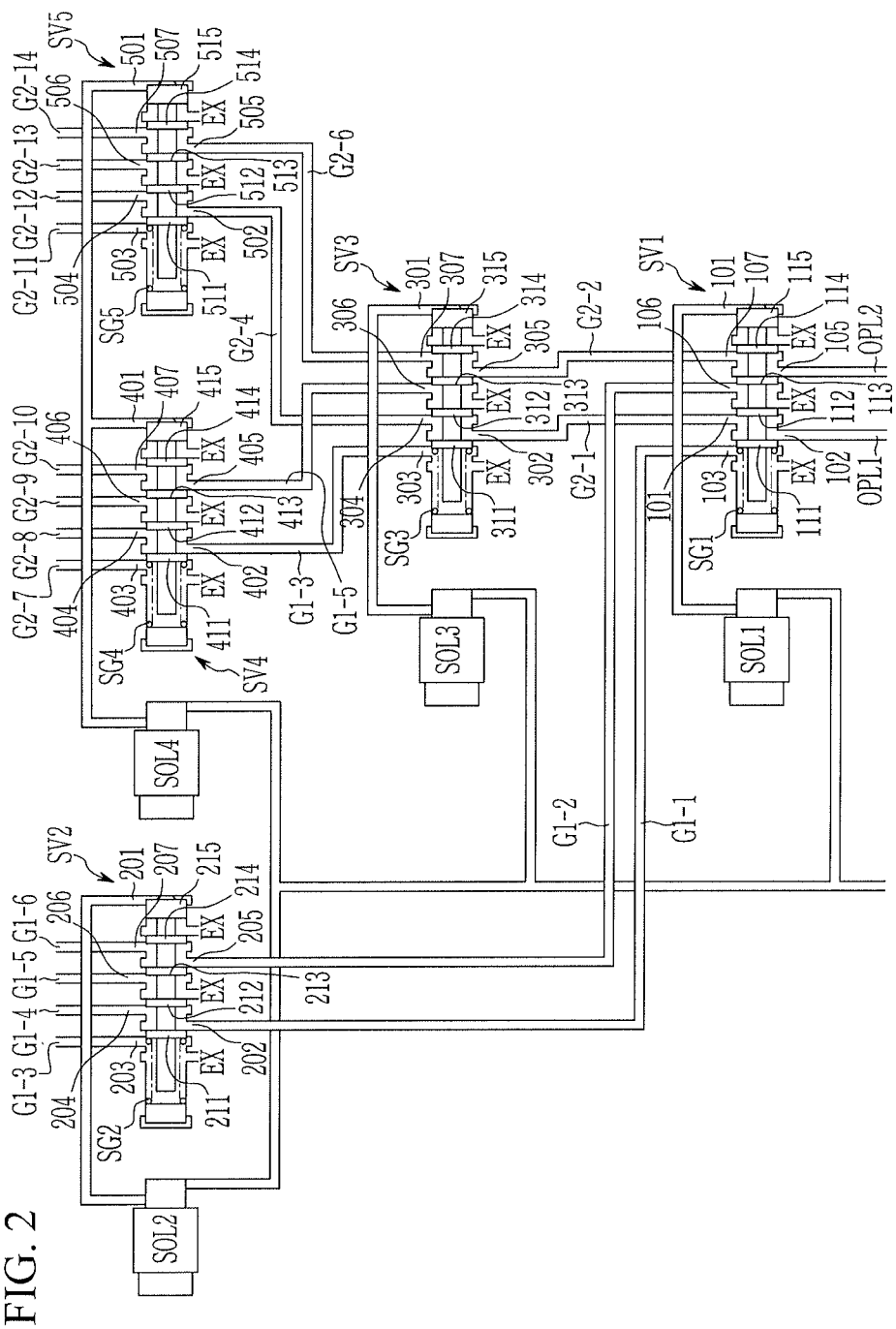
FIG. 2 illustrates an enlarged view of shift valves in a hydraulic control apparatus of a shift control unit for a dual clutch transmission according to various exemplary embodiments of the present invention.

FIG. 2 illustrates an enlarged view of shift valves in a hydraulic control apparatus of a shift control unit for a dual clutch transmission according to various exemplary embodiments of the present invention.

Referring to FIG. 2, the first shift valve SV1 selectively supplies the hydraulic pressure received through the first and second discharge hydraulic lines OPL1 and OPL2 to the second shift valve SV2 and the third shift valve SV3.

The first shift valve SV1 is formed as a spool valve having a valve body and a valve spool disposed in the valve body, and converts hydraulic communication by being controlled by an elastic force of an elastic member SG1 and a control pressure of the first solenoid valve SOL1 applied to an opposite side of the elastic member SG1.

The valve body of the first shift valve SV1 includes a first port 101 receiving the hydraulic pressure of the first solenoid valve SOL1, a second port 102 receiving the hydraulic pressure of the first discharge hydraulic line OPL1, a third port 103 selectively supplying the hydraulic pressure of the second port 102 to the first group first hydraulic line G1-1, a fourth port 104 selectively supplying the hydraulic pressure of the second port 102 to the second group first hydraulic line G2-1, a fifth port 105 receiving the hydraulic pressure of the second discharge hydraulic line OPL2, a sixth port 106 selectively supplying the hydraulic pressure of the fifth port 105 to the first group second hydraulic line G1-2, a seventh port 107 selectively supplying the hydraulic pressure of the fifth port 105 to the second group second hydraulic line G2-2, and three exhaust ports EX exhausting the hydraulic pressure received through the third, fourth, sixth, and seventh ports 103, 104, 106, and 107.

The valve spool of the first shift valve SV1 includes a first land 111 selectively connecting the second port 102 and the third port 103, a second land 112 selectively connecting the second port 102 and the fourth port 104 in cooperation with the first land 111, a third land 113 selectively connecting the fifth port 105 and the sixth port 106, a fourth land 114 selectively connecting the second port 102 and the seventh port 107 in cooperation with the third land 113, and a fifth land 115 applied with the control pressure of the first solenoid valve SOL1.

As a result, when the first solenoid valve SOL1 is deactivated, the valve spool of the first shift valve SV1 moves to the right in the drawing to form hydraulic communication to supply the hydraulic pressure of the second port 102 to the fourth port 104, and to supply the hydraulic pressure of the fifth port 105 to the seventh port 107.

In the instant case, the third and sixth ports 103 and 106 communicate with exhaust port EX, and the hydraulic pressure of the first group first and second hydraulic lines G1-1 and G1-2 is exhausted.

When the first solenoid valve SOL1 is activated, the valve spool moves to the left in the drawing to form hydraulic communication to supply the hydraulic pressure of the second port 102 to the third port 103, and to supply the hydraulic pressure of the fifth port 105 to the sixth port 106.

In the instant case, the fourth and seventh ports 204 and 207 communicate with exhaust port EX, and the hydraulic pressure of the second group first and second hydraulic lines G2-1 and G2-2 is exhausted.

The second shift valve SV2 selectively supplies the hydraulic pressure received through the first group first and second hydraulic lines G1-1 and G1-2 to the first and second chambers CB11 and CB12 of the first actuator ACT1 and the first and second chambers CB21 and CB22 of the second actuator ACT2.

The second shift valve SV2 is formed as a spool valve having a valve body and a valve spool disposed in the valve body, and converts hydraulic communication by being controlled by an elastic force of an elastic member SG2 and a control pressure of the second solenoid valve SOL2 applied to an opposite side of the elastic member SG2.

The valve body of the second shift valve SV2 includes a first port 201 receiving the hydraulic pressure of the second solenoid valve SOL2, a second port 202 receiving the hydraulic pressure of the first group first hydraulic line G1-1, a third port 203 selectively supplying the hydraulic pressure of the second port 202 to the first group third hydraulic line G1-3, a fourth port 204 selectively supplying the hydraulic pressure of the second port 202 to the first group fourth hydraulic line G1-4, a fifth port 205 receiving the hydraulic pressure of the first group second hydraulic line G1-2, a sixth port 206 selectively supplying the hydraulic pressure of the fifth port 205 to the first group fifth hydraulic line G1-5, a seventh port 207 selectively supplying the hydraulic pressure of the fifth port 205 to the first group sixth hydraulic line G1-6, and three exhaust ports EX exhausting the hydraulic pressure received through the third, fourth, sixth, and seventh ports 203, 204, 206, and 207.

The valve spool of the second shift valve SV2 includes a first land 211 selectively connecting the second port 202 and the third port 203, a second land 212 selectively connecting the second port 202 and the fourth port 204 in cooperation with the first land 211, a third land 213 selectively connecting the fifth port 205 and the sixth port 206, a fourth land 214 selectively connecting the second port 202 and the seventh port 207 in cooperation with the third land 213, and a fifth land 215 applied with the control pressure of the second solenoid valve SOL2.

As a result, when the second solenoid valve SOL2 is deactivated, the valve spool of the second shift valve SV2 moves to the right in the drawing to form hydraulic communication to supply the hydraulic pressure of the second port 202 to the fourth port 204, and to supply the hydraulic pressure of the fifth port 205 to the seventh port 207.

In the instant case, the third and sixth ports 203 and 206 communicate with the exhaust port EX, and the hydraulic pressure of the first group third and fifth hydraulic lines G1-3 and G1-5 is exhausted.

When the second solenoid valve SOL2 is activated, the valve spool moves to the left in the drawing to form hydraulic communication to supply the hydraulic pressure of the second port 202 to the third port 203, and to supply the hydraulic pressure of the fifth port 205 to the sixth port 206.

In the instant case, the fourth and seventh ports 204 and 207 communicate with the exhaust port EX, and the hydraulic pressure of the first group fourth and sixth hydraulic lines G1-4 and F1-6 is exhausted.

The third shift valve SV3 selectively supplies the hydraulic pressure received through the second group first and second hydraulic lines G2-1 and G2-2 to the fourth shift valve SV4 and the fifth shift valve SV5.

The third shift valve SV3 is formed as a spool valve having a valve body and a valve spool disposed in the valve body, and converts hydraulic communication by being controlled by an elastic force of an elastic member SG3 and a control pressure of the third solenoid valve SOL3 applied to an opposite side of the elastic member SG3.

The valve body of the third shift valve SV3 includes a first port 301 receiving the hydraulic pressure of the third solenoid valve SOL3, a second port 302 receiving the hydraulic pressure of the second group first hydraulic line G2-1, a third port 303 selectively supplying the hydraulic pressure of the second port 302 to the second group third hydraulic line G2-3, a fourth port 304 selectively supplying the hydraulic pressure of the second port 302 to the second group fourth hydraulic line G2-4, a fifth port 305 receiving the hydraulic pressure of the second group second hydraulic line G2-2, a sixth port 306 selectively supplying the hydraulic pressure of the fifth port 305 to the second group fifth hydraulic line G2-5, a seventh port 307 selectively supplying the hydraulic pressure of the fifth port 305 to the second group sixth hydraulic line G2-6, and three exhaust ports EX exhausting the hydraulic pressure received through the third, fourth, sixth, and seventh ports 303, 304, 306, and 307.

The valve spool of the third shift valve SV3 includes a first land 311 selectively connecting the second port 302 and the third port 303, a second land 312 selectively connecting the second port 302 and the fourth port 304 in cooperation with the first land 311, a third land 313 selectively connecting the fifth port 305 and the sixth port 306, a fourth land 314 selectively connecting the second port 302 and the seventh port 307 in cooperation with the third land 313, and a fifth land 315 applied with the control pressure of the third solenoid valve SOL3.

As a result, when the third solenoid valve SOL3 is deactivated, the valve spool of the third shift valve SV3 moves to the right in the drawing to form hydraulic communication to supply the hydraulic pressure of the second port 302 to the fourth port 304, and to supply the hydraulic pressure of the fifth port 305 to the seventh port 307.

In the instant case, the third and sixth ports 303 and 306 communicate with the exhaust port EX, and the hydraulic pressure of the second group third and fifth hydraulic lines G2-3 and G2-5 is exhausted.

When the third solenoid valve SOL3 is activated, the valve spool moves to the left in the drawing to form hydraulic communication to supply the hydraulic pressure of the second port 302 to the third port 303, and to supply the hydraulic pressure of the fifth port 305 to the sixth port 306.

In the instant case, the fourth and seventh ports 304 and 307 communicate with the exhaust port EX, and the hydraulic pressure of the second group fourth and sixth hydraulic lines G2-4 and G2-6 is exhausted.

The fourth shift valve SV4 selectively supplies the hydraulic pressure received through the second group third and fifth hydraulic lines G2-3 and G2-5 to the first and second chambers CB31 and CB32 of the third actuator ACT3 and the first and second chambers CB51 and CB52 of the fifth actuator ACT5.

The fourth shift valve SV4 is formed as a spool valve having a valve body and a valve spool disposed in the valve body, and converts hydraulic communication by being controlled by an elastic force of an elastic member SG4 and a control pressure of the fourth solenoid valve SOL4 applied to an opposite side of the elastic member SG4.

The valve body of the fourth shift valve SV4 includes a first port 401 receiving the hydraulic pressure of the fourth solenoid valve SOL4, a second port 402 receiving the hydraulic pressure of the second group third hydraulic line G2-3, a third port 403 selectively supplying the hydraulic pressure of the second port 402 to the second group seventh hydraulic line G2-7, a fourth port 404 selectively supplying the hydraulic pressure of the second port 402 to the second group eighth hydraulic line G2-8, a fifth port 405 receiving the hydraulic pressure of the second group fifth hydraulic line G2-5, a sixth port 406 selectively supplying the hydraulic pressure of the fifth port 405 to the second group ninth hydraulic line G2-9, a seventh port 407 selectively supplying the hydraulic pressure of the fifth port 405 to the second group tenth hydraulic line G2-10, and three exhaust ports EX exhausting the hydraulic pressure received through the third, fourth, sixth, and seventh ports 403, 404, 406, and 407.

The valve spool of the fourth shift valve SV4 includes a first land 411 selectively connecting the second port 402 and the third port 403, a second land 412 selectively connecting the second port 402 and the fourth port 404 in cooperation with the first land 411, a third land 413 selectively connecting the fifth port 405 and the sixth port 406, a fourth land 414 selectively connecting the second port 402 and the seventh port 407 in cooperation with the third land 413, and a fifth land 415 applied with the control pressure of the fourth solenoid valve SOL4.

As a result, when the fourth solenoid valve SOL4 is deactivated, the valve spool of the fourth shift valve SV4 moves to the right in the drawing to form hydraulic communication to supply the hydraulic pressure of the second port 402 to the fourth port 404, and to supply the hydraulic pressure of the fifth port 405 to the seventh port 407.

In the instant case, the third and sixth ports 403 and 406 communicate with the exhaust port EX, and the hydraulic pressure of the second group seventh, ninth even-numbered shift-stage hydraulic line G2-7 and G2-9 is exhausted.

When the fourth solenoid valve SOL4 is activated, the valve spool moves to the left in the drawing to form hydraulic communication to supply the hydraulic pressure of the second port 402 to the third port 403, and to supply the hydraulic pressure of the fifth port 405 to the sixth port 406.

In the instant case, the fourth and seventh ports 404 and 407 communicate with the exhaust port EX, and the hydraulic pressure of the second group eighth and tenth hydraulic lines G2-8 and G2-10 is exhausted.

The fifth shift valve SV5 selectively supplies the hydraulic pressure received through the second group fourth and sixth hydraulic lines G2-4 and G2-6 to the first and second chambers CB51 and CB52 of the fifth actuator ACT5 and the exhaust port EX.

The fifth shift valve SV5 is formed as a spool valve having a valve body and a valve spool disposed in the valve body, and converts hydraulic communication by being controlled by an elastic force of an elastic member SG5 and a control pressure of the fourth solenoid valve SOL4 applied to an opposite side of the elastic member SG5.

The valve body of the fifth shift valve SV5 includes a first port 501 receiving the hydraulic pressure of the fourth solenoid valve SOL4, a second port 502 receiving the hydraulic pressure of the second group fourth hydraulic line G2-4, a third port 503 selectively supplying the hydraulic pressure of the second port 502 to the second group eleventh hydraulic line G2-11, a fourth port 504 selectively supplying the hydraulic pressure of the second port 502 to the second group twelfth hydraulic line G2-12, a fifth port 505 receiving the hydraulic pressure of the second group sixth hydraulic line G2-6, a sixth port 506 selectively supplying the hydraulic pressure of the fifth port 505 to the second group thirteenth hydraulic line G2-13, a seventh port 507 selectively supplying the hydraulic pressure of the fifth port 505 to the second group fourteenth hydraulic line G2-14, and three exhaust ports EX exhausting the hydraulic pressure received through the third, fourth, sixth, and seventh ports 503, 504, 506, and 507.

The valve spool of the fifth shift valve SV5 includes a first land 511 selectively connecting the second port 502 and the third port 503, a second land 512 selectively connecting the second port 502 and the fourth port 504 in cooperation with the first land 511, a third land 513 selectively connecting the fifth port 505 and the sixth port 506, a fourth land 514 selectively connecting the second port 502 and the seventh port 507 in cooperation with the third land 513, and a fifth land 515 applied with the control pressure of the fourth solenoid valve SOL4.

As a result, when the fourth solenoid valve SOL4 is deactivated, the valve spool of the fourth shift valve SV4 moves to the right in the drawing to form hydraulic communication to supply the hydraulic pressure of the second port 502 to the fourth port 504, and to supply the hydraulic pressure of the fifth port 505 to the seventh port 507.

In the instant case, the third and sixth ports 503 and 506 communicate with the exhaust port EX, and the hydraulic pressure of the second group eleventh and thirteenth even-numbered shift-stage hydraulic lines G2-11 and G2-13 is exhausted.

When the fourth solenoid valve SOL4 is activated, the valve spool moves to the left in the drawing to form hydraulic communication to supply the hydraulic pressure of the second port 502 to the third port 503, and to supply the hydraulic pressure of the fifth port 505 to the sixth port 506.

In the instant case, the fourth and seventh ports 504 and 507 communicate with the exhaust port EX, and the hydraulic pressure of the second group twelfth, fourteenth hydraulic line G2-12 and G2-14 is exhausted.

Referring to FIG. 1 and FIG. 2, the hydraulic pressure is supplied to the actuators ACT1 to ACT5 as follows.

Hydraulic pressure controlled by the first pressure control solenoid valve PC-SOL1 V/V is supplied to the first chamber CB11 of the first actuator ACT1. The second port 102 and the third port 103 of the first shift valve SV1 communicate by operating the first solenoid valve SOL1. Therefore, the hydraulic pressure controlled by the first pressure control solenoid valve PC-SOL1 V/V is supplied to the second port 202 of the second shift valve SV2 through the first group first hydraulic line G1-1.

As such, the second port 202 and the third port 203 of the second shift valve SV2 communicate with each other by operation of the second solenoid valve SOL2. Therefore, the hydraulic pressure supplied to the second port 202 is supplied to the first chamber CB11 of the first actuator ACT1 through the first group third hydraulic line G1-3 connected to the third port 203.

Hydraulic pressure controlled by the second pressure control solenoid valve PC-SOL2 V/V is supplied to the second chamber CB12 of the first actuator ACT1. The fifth port 105 and the sixth port 106 of the first shift valve SV1 communicate by operating the first solenoid valve SOL1. Therefore, the hydraulic pressure controlled by the second pressure control solenoid valve PC-SOL2 V/V is supplied to the fifth port 205 of the second shift valve SV2 through the first group second hydraulic line G1-2.

As such, the fifth port 205 and the sixth port 206 of the second shift valve SV2 communicate with each other by operation of the second solenoid valve SOL2. Therefore, the hydraulic pressure supplied to the fifth port 205 is supplied to the second chamber CB12 of the first actuator (AC1T) through the fifth odd-numbered shift-stage hydraulic line ENS connected to the sixth port 206.

Hydraulic pressure controlled by the first pressure control solenoid valve PC-SOL1 V/V is supplied to the first chamber CB21 of the second actuator ACT2. The second port 102 and the third port 103 of the first shift valve SV1 communicate by operating the first solenoid valve SOL1. Therefore, the hydraulic pressure controlled by the first pressure control solenoid valve PC-SOL1 V/V is supplied to the second port 202 of the second shift valve SV2 through the first group first hydraulic line G1-1.

As such, the second port 202 and the fourth port 204 of the second shift valve SV2 communicate with each other by deactivation of the second solenoid valve SOL2. Therefore, the hydraulic pressure supplied to the second port 202 is supplied to the first chamber CB21 of the second actuator ACT2 through the first group fourth hydraulic line G1-4 connected to the fourth port 204.

Hydraulic pressure controlled by the second pressure control solenoid valve PC-SOL2 V/V is supplied to the second chamber CB22 of the second actuator ACT2. The fifth port 105 and the sixth port 106 of the first shift valve SV1 communicate by operating the first solenoid valve SOL1. Therefore, the hydraulic pressure controlled by the second pressure control solenoid valve PC-SOL2 V/V is supplied to the fifth port 205 of the second shift valve SV2 through the first group second hydraulic line G1-2.

As such, the fifth port 205 and the seventh port 207 of the second shift valve SV2 communicate with each other by deactivation of the second solenoid valve SOL2. Therefore, the hydraulic pressure supplied to the fifth port 205 is supplied to the second chamber CB22 of the second actuator ACT2 through the first group sixth hydraulic line G1-6 connected to the seventh port 207.

Hydraulic pressure controlled by the first pressure control solenoid valve PC-SOL1 V/V is supplied to the first chamber CB31 of the third actuator ACT3. The second port 102 and the fourth port 104 of the first shift valve SV1 communicate by deactivation of the first solenoid valve SOL1. Therefore, the hydraulic pressure controlled by the first pressure control solenoid valve PC-SOL1 V/V is supplied to the second port 302 of the third shift valve SV3 through the second group first hydraulic line G2-1.

As such, the second port 302 and the third port 303 of the third shift valve SV3 communicate with each other by operation of the third solenoid valve SOL3. Therefore, the hydraulic pressure supplied to the second port 302 is supplied to the second port 402 of the fourth shift valve SV4 through the second group third hydraulic line G2-3 connected to the third port 303.

Furthermore, the second port 402 and the third port 403 of the fourth shift valve SV4 communicate with each other by operation of the fourth solenoid valve SOL4. Therefore, the hydraulic pressure supplied to the second port 402 is supplied to the first chamber CB31 of the third actuator ACT3 through the second group seventh hydraulic line G2-7 connected to the third port 403.

Hydraulic pressure controlled by the second pressure control solenoid valve PC-SOL2 V/V is supplied to the second chamber CB32 of the third actuator ACT3. The fifth port 105 and the seventh port 107 of the first shift valve SV1 communicate by deactivation of the first solenoid valve SOL1. Therefore, the hydraulic pressure controlled by the second pressure control solenoid valve PC-SOL2 V/V is supplied to the fifth port 305 of the third shift valve SV3 through the second group second hydraulic line G2-2.

As such, the fifth port 305 and the sixth port 306 of the third shift valve SV3 communicate with each other by operation of the third solenoid valve SOL3. Therefore, the hydraulic pressure supplied to the fifth port 305 is supplied to the fifth port 405 of the fourth shift valve SV4 through the second group fifth hydraulic line G2-5 connected to the sixth port 306.

Furthermore, the fifth port 405 and the sixth port 406 of the fourth shift valve SV4 communicate with each other by operation of the fourth solenoid valve SOL4. Therefore, the hydraulic pressure supplied to the fifth port 405 is supplied to the second chamber CB42 of the third actuator ACT3 through the second group ninth hydraulic line G2-9 connected to the sixth port 406.

Hydraulic pressure controlled by the first pressure control solenoid valve PC-SOL1 V/V is supplied to the first chamber CB41 of the fourth actuator ACT4. The second port 102 and the fourth port 104 of the first shift valve SV1 communicate by deactivation of the first solenoid valve SOL1. Therefore, the hydraulic pressure controlled by the first pressure control solenoid valve PC-SOL1 V/V is supplied to the second port 302 of the third shift valve SV3 through the second group first hydraulic line G2-1.

As such, the second port 302 and the third port 303 of the third shift valve SV3 communicate with each other by operation of the third solenoid valve SOL3. Therefore, the hydraulic pressure supplied to the second port 302 is supplied to the second port 402 of the fourth shift valve SV4 through the second group third hydraulic line G2-3 connected to the third port 303.

Furthermore, the second port 402 and the fourth port 404 of the fourth shift valve SV4 communicate with each other by deactivation of the fourth solenoid valve SOL4. Therefore, the hydraulic pressure supplied to the second port 402 is supplied to the first chamber CB41 of the fourth actuator ACT4 through the second group eighth hydraulic line G2-8 connected to the fourth port 404.

Hydraulic pressure controlled by the second pressure control solenoid valve PC-SOL2 V/V is supplied to the second chamber CB42 of the fourth actuator ACT4. The fifth port 105 and the sixth port 106 of the first shift valve SV1 communicate by deactivation of the first solenoid valve SOL1. Therefore, the hydraulic pressure controlled by the second pressure control solenoid valve PC-SOL2 V/V is supplied to the fifth port 305 of the third shift valve SV3 through the second group second hydraulic line G2-2.

As such, the fifth port 305 and the sixth port 306 of the third shift valve SV3 communicate with each other by operation of the third solenoid valve SOL3. Therefore, the hydraulic pressure supplied to the fifth port 305 is supplied to the fifth port 405 of the fourth shift valve SV4 through the second group fifth hydraulic line G2-5 connected to the sixth port 306.

Furthermore, the fifth port 405 and the seventh port 407 of the fourth shift valve SV4 communicate with each other by deactivation of the fourth solenoid valve SOL4. Therefore, the hydraulic pressure supplied to the fifth port 405 is supplied to the second chamber CB42 of the fourth actuator ACT4 through the second group tenth hydraulic line G2-10 connected to the seventh port 407.

Hydraulic pressure controlled by the first pressure control solenoid valve PC-SOL1 V/V is supplied to the first chamber CB51 of the fifth actuator ACT5. The second port 102 and the fourth port 104 of the first shift valve SV1 communicate by deactivation of the first solenoid valve SOL1. Therefore, the hydraulic pressure controlled by the first pressure control solenoid valve PC-SOL1 V/V is supplied to the second port 302 of the third shift valve SV3 through the second group first hydraulic line G2-1.

As such, the second port 302 and the fourth port 304 of the third shift valve SV3 communicate with each other by deactivation of the third solenoid valve SOL3. Therefore, the hydraulic pressure supplied to the second port 302 is supplied to the second port 502 of the fifth shift valve SV5 through the second group fourth hydraulic line G2-4 connected to the fourth port 304.

Furthermore, the second port 502 and the third port 503 of the fifth shift valve SV5 communicate with each other by operation of the fourth solenoid valve SOL4. Therefore, the hydraulic pressure supplied to the second port 502 is supplied to the first chamber CB51 of the fifth actuator ACT5 through the second group eleventh even-numbered shift-stage hydraulic line G2-11 connected to the third port 503.

Hydraulic pressure controlled by the second pressure control solenoid valve PC-SOL2 V/V is supplied to the second chamber CB52 of the fifth actuator ACT5. The fifth port 105 and the seventh port 107 of the first shift valve SV1 communicate by deactivation of the first solenoid valve SOL1. Therefore, the hydraulic pressure controlled by the second pressure control solenoid valve PC-SOL2 V/V is supplied to the fifth port 305 of the third shift valve SV3 through the second group second hydraulic line G2-2.

As such, the fifth port 305 and the seventh port 307 of the third shift valve SV3 communicate with each other by deactivation of the third solenoid valve SOL3. Therefore, the hydraulic pressure supplied to the fifth port 305 is supplied to the fifth port 505 of the fifth shift valve SV5 through the second group sixth hydraulic line ON6 connected to the seventh port 307.

Furthermore, the fifth port 505 and the sixth port 506 of the fifth shift valve SV5 communicate with each other by operation of the fourth solenoid valve SOL4. Therefore, the hydraulic pressure supplied to the fifth port 505 is supplied to the second chamber CB52 of the fifth actuator ACT5 through the second group thirteenth hydraulic line G2-13 connected to the sixth port 406.

A hydraulic control apparatus of a shift control unit for a dual clutch transmission according to various exemplary embodiments of the present invention realizes nine forward speeds and one reverse speed by converting hydraulic communications of the first to fifth shift valves SV1 to SV5 by independently controlling of the first and second pressure control solenoid valves PC-SOL1 V/V and PC-SOL2 V/V and the first to fourth solenoid valves SOL1 to SOL4.

A hydraulic control apparatus of a shift control unit for a dual clutch transmission according to various exemplary embodiments of the present invention may realize reduction of production cost by employing minimal number of shift valves by commonly utilizing a shift valve in shifting operations.

A hydraulic control apparatus of a shift control unit for a dual clutch transmission according to various exemplary embodiments of the present invention classifies the actuators into a first group involved in realizing odd-numbered shifting stages and a second group involved in realizing odd-numbered shifting stages and the reverse speed.

The first group includes the first and second actuators ACT1 and ACT2 controlled by hydraulic pressure supplied from the first shift valve SV1 to the second shift valve SV2. The second group includes the third, fourth, and fifth actuators ACT3, ACT4, and ACT5 controlled by hydraulic pressure supplied from the first shift valve SV1 to the third shift valve SV3.

A hydraulic control apparatus of a shift control unit for a dual clutch transmission according to various exemplary embodiments of the present invention are directed to providing a fail-safe mode driving by controlling the third, fourth, and fifth actuators ACT3, ACT4, and ACT5 in the case of a failure of the first solenoid valve SOL1 or the second solenoid valve SOL2, and a fail-safe mode driving by controlling the first and second actuators ACT1 and ACT2 in the case of a failure of the third solenoid valve SOL3 or fourth solenoid valve SOL4.

That is, a hydraulic control apparatus of a shift control unit for a dual clutch transmission according to various exemplary embodiments of the present invention are directed to providing a fail-safe mode driving in odd-numbered shifting stages or in even-numbered shifting stages in the case of a failure of the first to fourth solenoid valves SOL1 to SOL4.

Figure 3:
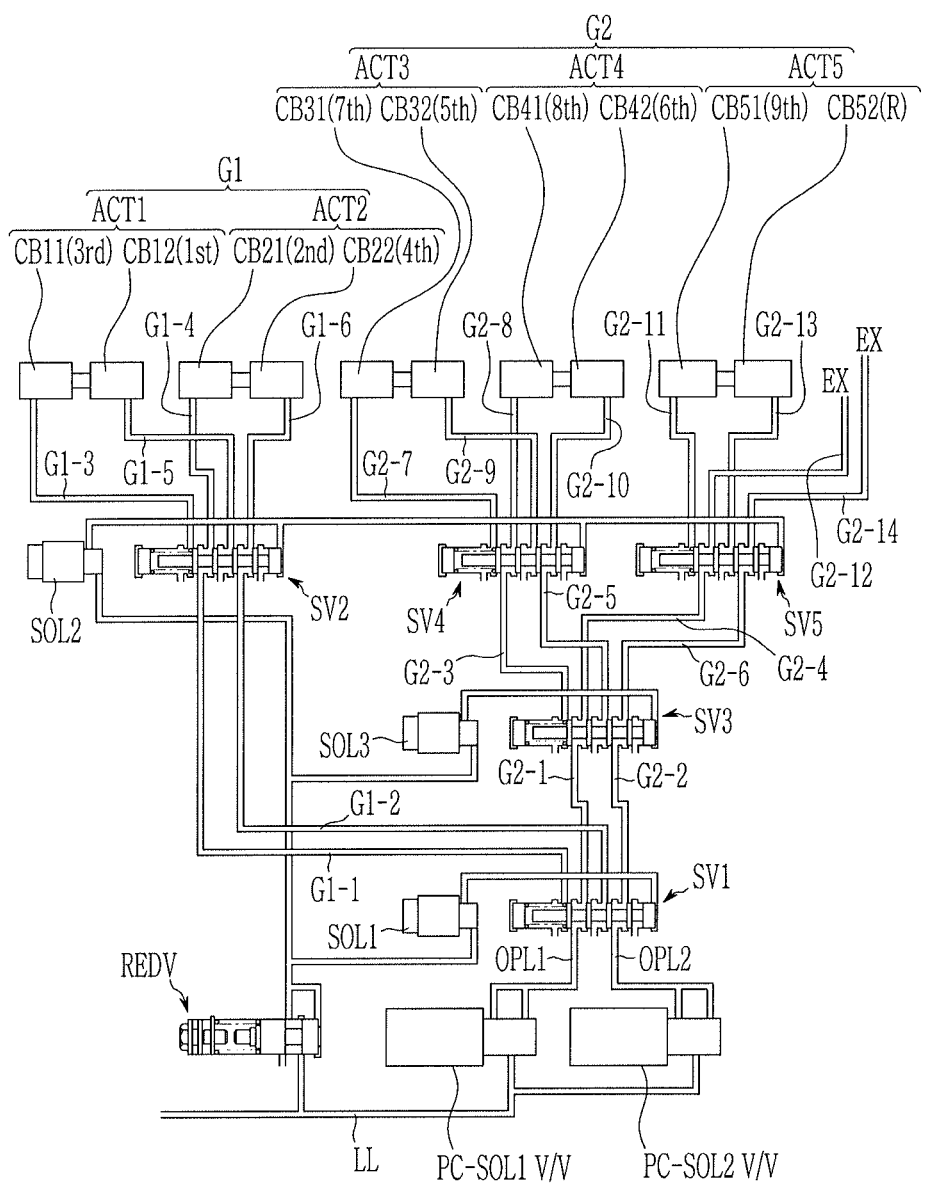
FIG. 3 is a schematic diagram of a hydraulic control apparatus of a shift control unit for a dual clutch transmission according to various exemplary embodiments of the present invention.

FIG. 3 is a schematic diagram of a hydraulic control apparatus of a shift control unit for a dual clutch transmission according to various exemplary embodiments of the present invention.

Referring to FIG. 3, according to a hydraulic control apparatus of various exemplary embodiments in comparison with the various exemplary embodiments of the present invention, the fourth solenoid valve SOL4 controlling the fourth and fifth shift valves SV4 and SV5 is deleted, and instead, the second solenoid valve SOL2 controlling the second shift valve SV2 also controls the fourth shift valve SV4 and the fifth shift valve SV5.

The first and second chambers CB11 and CB12 of the first actuator ACT1 are chambers for the third speed and the first speed. The first and second chambers CB21 and CB22 of the second actuator ACT2 are chambers for the second speed and the fourth speed. The first and second chambers CB31 and CB32 of the third actuator ACT3 are chambers for the seventh speed and the fifth speed. The first and second chambers CB41 and CB42 of the fourth actuator ACT4 are chambers for the eighth speed and the sixth speed. The first and second chambers CB51 and CB52 of the fifth actuator ACT5 are chambers for the ninth forward speed and the reverse speed (in the case of eight forward speed transmission, neutral N and the reverse speed R).

Therefore, the first group G1 including the first and second actuators ACT1 and ACT2 is involved in realizing low gears, and the second group G2 including the third, fourth, and fifth actuators ACT3, ACT4, and ACT5 is involved in realizing high gears in the reverse speed. Furthermore, the first, third, and fifth actuators ACT1, ACT3, and ACT5 are involved in odd-numbered shifting stages, and the second and fourth actuators ACT2 and ACT4 are involved in even-numbered shifting stages.

Therefore, in the case of a failure of the first solenoid valve SOL1, a low gear driving or a high gear driving is available by controlling the first and second actuators ACT1 and ACT2 or the third, fourth, and fifth actuators ACT3, ACT4, and ACT5. In the case of a failure of the second solenoid valve SOL2, driving in the odd-numbered shifting stages or in the even-numbered shifting stages is available by controlling the second and fourth actuators ACT2 and ACT4 or the first and third actuators ACT1 and ACT3. In the case of a failure of the third solenoid valve SOL3, driving in the odd-numbered shifting stages or in low and high gears is available by controlling the first and second actuators ACT1 and ACT2 or the first, second, third, and fourth actuators ACT1, ACT2, ACT3, and ACT4.

The first to fourth shift valves SV1 to SV4 remain the same as the various exemplary embodiments of the present invention, except that the control pressure of second solenoid valve SOL2 is also used as the control pressure of the fourth and fifth shift valves SV4 and SV5.

A hydraulic control apparatus of a shift control unit for a dual clutch transmission according to various exemplary embodiments of the present invention realizes nine forward speeds and one reverse speed by converting hydraulic communications of the first to fifth shift valves SV1 to SV5 by independently controlling of the first and second pressure control solenoid valves PC-SOL1 V/V and PC-SOL2 V/V and the first to third solenoid valve SOL1 to SOL3.

A hydraulic control apparatus of a shift control unit for a dual clutch transmission according to various exemplary embodiments of the present invention may realize reduction of production cost by employing minimal number of shift valves by commonly utilizing a shift valve in shifting operations, deleting a fourth solenoid valve in comparison with the various exemplary embodiments.

Figure 4:
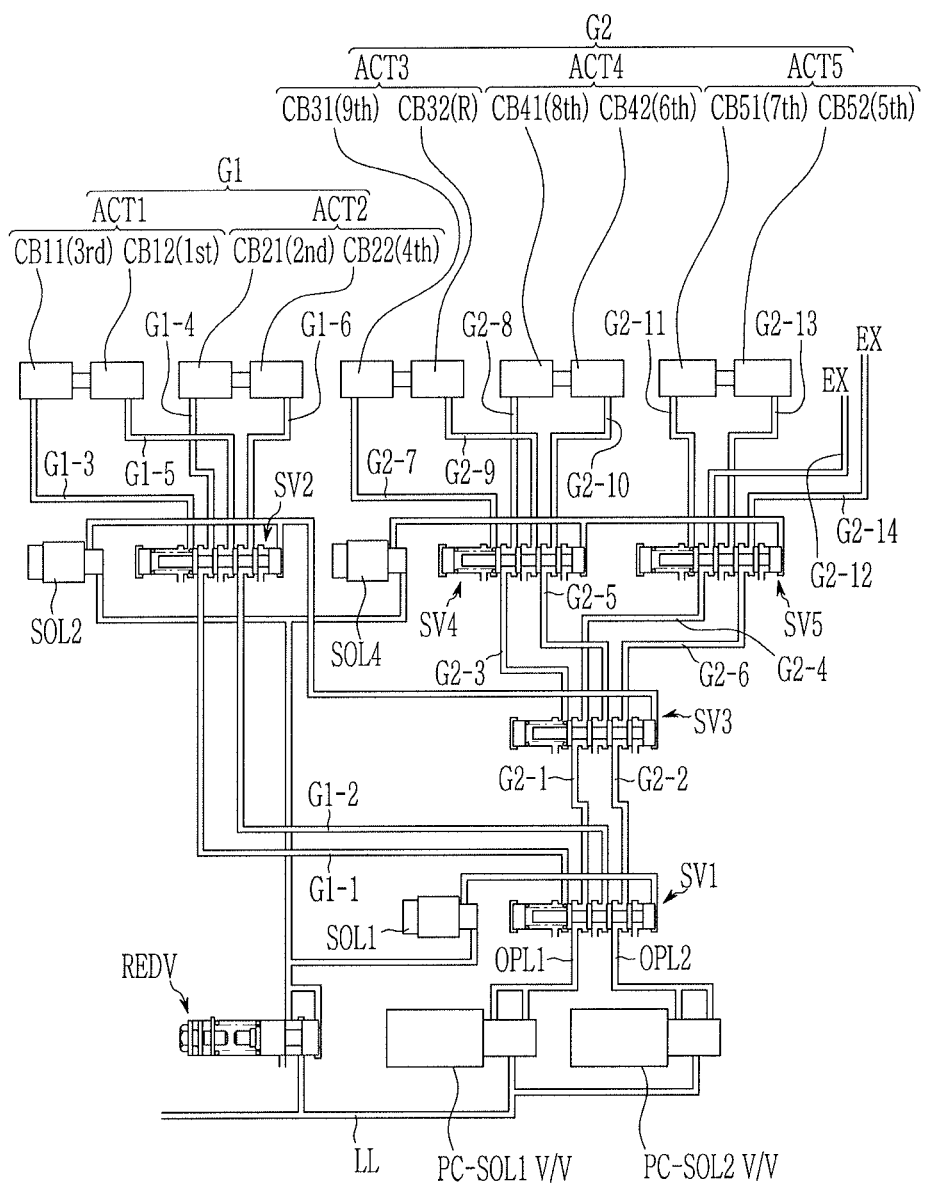
FIG. 4 is a schematic diagram of a hydraulic control apparatus of a shift control unit for a dual clutch transmission according to various exemplary embodiments of the present invention.

FIG. 4 is a schematic diagram of a hydraulic control apparatus of a shift control unit for a dual clutch transmission according to various exemplary embodiments of the present invention.

Referring to FIG. 4, according to a hydraulic control apparatus of various exemplary embodiments in comparison with the various exemplary embodiments of the present invention, the third solenoid valve SOL3 controlling the third shift valve SV3 is deleted, and instead, the second solenoid valve SOL2 controlling the second shift valve SV2 also controls the third shift valve SV3.

The first and second chambers CB11 and CB12 of the first actuator ACT1 are chambers for the third speed and the first speed. The first and second chambers CB21 and CB22 of the second actuator ACT2 are chambers for the second speed and the fourth speed. The first and second chambers CB31 and CB32 of the third actuator ACT3 are chambers for the ninth forward speed and the reverse speed (in the case of eight forward speed transmission, neutral N and the reverse speed R). The first and second chambers CB41 and CB42 of the fourth actuator ACT4 are chambers for the eighth speed and the sixth speed. The first and second chambers CB51 and CB52 of the fifth actuator ACT5 are chambers for the seventh speed and the fifth speed.

Therefore, the first group G1 including the first and second actuators ACT1 and ACT2 is involved in realizing low gears, and the second group G2 including the third, fourth, and fifth actuators ACT3, ACT4, and ACT5 is involved in realizing high gears an t Furthermore, the first, third, and fifth actuators ACT1, ACT3, and ACT5 are involved in odd-numbered shifting stages, and the second and fourth actuators ACT2 and ACT4 are involved in even-numbered shifting stages.

Therefore, in the case of a failure of the first solenoid valve SOL1, a low gear driving or a high gear driving is available by controlling the first and second actuators ACT1 and ACT2 or the third, fourth, and fifth actuators ACT3, ACT4, and ACT5. In the case of a failure of the second solenoid valve SOL2, driving in the odd-numbered shifting stages or in the even-numbered shifting stages is available by controlling the second and fifth actuators ACT2 and ACT5 or the first, third, and fourth actuators ACT1, ACT3, and ACT4. In the case of a failure of the fourth solenoid valve SOL4, driving in the odd-numbered shifting stages or in low and high gears is available by controlling the first and second actuators ACT1 and ACT2 or the first, second, third, and fourth actuators ACT1, ACT2, ACT3, and ACT4.

A hydraulic control apparatus of a shift control unit for a dual clutch transmission according to various exemplary embodiments of the present invention realizes nine forward speeds and one reverse speed by converting hydraulic communications of the first to fifth shift valves SV1 to SV5 by independently controlling of the first and second pressure control solenoid valves PC-SOL1 V/V and PC-SOL2 V/V and the first, second, and fourth solenoid valves SOL1, SOL2, and SOL4.

The first to fifth shift valves SV1 to SV5 remain the same as the various exemplary embodiments of the present invention, except that the control pressure of second solenoid valve SOL2 is also used as the control pressure of the third shift valve SV3.

A hydraulic control apparatus of a shift control unit for a dual clutch transmission according to various exemplary embodiments of the present invention may realize reduction of production cost by employing minimal number of shift valves by commonly utilizing a shift valve in shifting operations thereby deleting the third solenoid valve in comparison with the various exemplary embodiments.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control apparatus of a shift control unit for a dual clutch transmission, the hydraulic control apparatus comprising:
    a first pressure control solenoid valve variably controlling a line pressure and outputting the controlled line pressure through a first discharge hydraulic line connected to the first pressure control solenoid valve;
    a second pressure control solenoid valve variably controlling the line pressure and outputting the controlled line pressure through a second discharge hydraulic line connected to the second pressure control solenoid valve;
    a first shift valve connected to the first and second discharge hydraulic lines and converting hydraulic communication to supply hydraulic pressures of the first and second pressure control solenoid valves received through the first and second discharge hydraulic lines to downstream sides thereof, each through two paths;
    a second shift valve connected to the first shift valve and converting hydraulic communication to selectively supply the hydraulic pressure of the first pressure control solenoid valve received from the first shift valve to a first chamber of a first actuator and a first chamber of a second actuator, and to selectively supply the hydraulic pressure of the second pressure control solenoid valve received from the first shift valve to a second chamber of the first actuator and a second chamber of the second actuator;
    a third shift valve connected to the first shift valve and converting hydraulic communication to supply the hydraulic pressure of the first and second pressure control solenoid valves received from the first shift valve to downstream sides thereof, each through two paths;

a fourth shift valve connected to the third shift valve and converting hydraulic communication to selectively supply the hydraulic pressure of the first pressure control solenoid valve received from the third shift valve to a first chamber of a third actuator and a first chamber of a fourth actuator, and to selectively supply the hydraulic pressure of the second pressure control solenoid valve received from the third shift valve to a second chamber of the third actuator and a second chamber of the fourth actuator; and a fifth shift valve connected to the third shift valve and converting hydraulic communication to selectively supply the hydraulic pressure of the first pressure control solenoid valve received from the third shift valve to a first chamber of a fifth actuator and an exhaust port, and to selectively supply the hydraulic pressure of the second pressure control solenoid valve received from the third shift valve to a second chamber of the fifth actuator and the exhaust port, wherein the first, second, third, fourth, and fifth shift valves are controlled by at least three solenoid valves each controlling hydraulic pressure received from a reducing valve that controls stably converts the line pressure to a hydraulic pressure lower than the line pressure.

2. The hydraulic control apparatus of claim 1, wherein the at least three solenoid valves comprise:
a first solenoid valve connected to the first shift valve and the reducing valve and controlling the first shift valve;
a second solenoid valve connected to the second shift valve and the reducing valve and controlling the second shift valve;
a third solenoid valve connected to the third shift valve and the reducing valve and controlling the third shift valve; and
a fourth solenoid valve connected to the reducing valve, the fourth shift valve and the fifth shift valve and controlling the fourth and fifth shift valves.

3. The hydraulic control apparatus of claim 2,
wherein the first, second, and third actuators control odd-numbered shifting stages and reverse speed; and
wherein the fourth and fifth actuators control even-numbered shifting stages.

4. The hydraulic control apparatus of claim 3,
wherein the first actuator includes the first and second chambers for a seventh speed and a fifth speed, respectively;
wherein the second actuator includes the first and second chambers for a third speed and a first speed, respectively;
wherein the third actuator includes the first and second chambers for a ninth forward speed and the reverse speed, respectively;
wherein the fourth actuator includes the first and second chambers for an eighth speed and a sixth speed, respectively; and
wherein the fifth actuator includes the first and second chambers for a second speed and a fourth speed, respectively.

5. The hydraulic control apparatus of claim 2,
wherein a fail-safe mode driving is realized by controlling the third, fourth, and fifth actuators in a case of a failure of the first solenoid valve or the second solenoid valve;
wherein a fail-safe mode driving is realized by controlling the first and second actuators in a case of a failure of the third solenoid valve or fourth solenoid valve.

6. The hydraulic control apparatus of claim 2, wherein the first shift valve is formed as a spool valve having a valve body and a valve spool disposed in the valve body, and converts hydraulic communication by being controlled by an elastic force of an elastic member and a control pressure of the first solenoid valve applied to an opposite side of the elastic member.

7. The hydraulic control apparatus of claim 6,
wherein the valve body of the first shift valve includes:
a first port receiving the hydraulic pressure of the first solenoid valve;
a second port receiving the hydraulic pressure of the first discharge hydraulic line;
a third port selectively supplying the hydraulic pressure of the second port to a first group first hydraulic line connecting the first shift valve and the second shift valve;
a fourth port selectively supplying the hydraulic pressure of the second port to a second group first hydraulic line connecting the first shift valve and the third shift valve;
a fifth port receiving the hydraulic pressure of the second discharge hydraulic line;
a sixth port selectively supplying the hydraulic pressure of the fifth port to a first group second hydraulic line connecting the first shift valve and the second shift valve;
a seventh port selectively supplying the hydraulic pressure of the fifth port to a second group second hydraulic line connecting the first shift valve and the third shift valve; and
three exhaust ports exhausting the hydraulic pressure received through the third, fourth, sixth, and seventh ports,
wherein the valve spool of the first shift valve includes:
a first land selectively connecting the second port and the third port;
a second land selectively connecting the second port and the fourth port in cooperation with the first land;
a third land selectively connecting the fifth port and the sixth port;
a fourth land selectively connecting the second port and the seventh port in cooperation with the third land; and
a fifth land applied with a control pressure of the first solenoid valve, and wherein the elastic member is disposed between the first land and the valve body.

8. The hydraulic control apparatus of claim 2, wherein the second shift valve is formed as a spool valve having a valve body and a valve spool disposed in the valve body, and converts hydraulic communication by being controlled by an elastic force of an elastic member and a control pressure of the second solenoid valve applied to an opposite side of the elastic member.

9. The hydraulic control apparatus of claim 8,
wherein the valve body of the second shift valve includes:
a first port receiving the hydraulic pressure of the second solenoid valve;
a second port receiving the hydraulic pressure of a first group first hydraulic line connecting the first shift valve and the second shift valve;
a third port selectively supplying the hydraulic pressure of the second port to a first group third hydraulic line;

a fourth port selectively supplying the hydraulic pressure of the second port to a first group fourth hydraulic line;
a fifth port receiving the hydraulic pressure of a first group second hydraulic line connecting the first shift valve and the second shift valve;
a sixth port selectively supplying the hydraulic pressure of the fifth port to a first group fifth hydraulic line;
a seventh port selectively supplying the hydraulic pressure of the fifth port to a first group sixth hydraulic line; and
three exhaust ports exhausting the hydraulic pressure received through the third, fourth, sixth, and seventh ports,
wherein the valve spool of the second shift valve includes:
a first land selectively connecting the second port and the third port;
a second land selectively connecting the second port and the fourth port in cooperation with the first land;
a third land selectively connecting the fifth port and the sixth port;
a fourth land selectively connecting the second port and the seventh port in cooperation with the third land; and
a fifth land applied with a control pressure of the second solenoid valve, and
wherein the elastic member is disposed between the first land and the valve body.

10. The hydraulic control apparatus of claim 2, wherein the third shift valve is formed as a spool valve having a valve body and a valve spool disposed in the valve body, and converts hydraulic communication by being controlled by an elastic force of an elastic member and a control pressure of the third solenoid valve applied to an opposite side of the elastic member.

11. The hydraulic control apparatus of claim 10,
wherein the valve body of the third shift valve includes:
a first port receiving the hydraulic pressure of the third solenoid valve;
a second port receiving the hydraulic pressure of a second group first hydraulic line connecting the first shift valve and the third shift valve;
a third port selectively supplying the hydraulic pressure of the second port to a second group third hydraulic line connecting the third shift valve and the fourth shift valve;
a fourth port selectively supplying the hydraulic pressure of the second port to a second group fourth hydraulic line connecting the third shift valve and the fifth shift valve;
a fifth port receiving the hydraulic pressure of a second group second hydraulic line connecting the second shift valve and the third shift valve;
a sixth port selectively supplying the hydraulic pressure of the fifth port to a second group fifth hydraulic line connecting the third shift valve and the fourth shift valve;
a seventh port selectively supplying the hydraulic pressure of the fifth port to a second group sixth hydraulic line connecting the third shift valve and the fifth shift valve; and
three exhaust ports exhausting the hydraulic pressure received through the third, fourth, sixth, and seventh ports,
wherein the valve spool of the third shift valve includes:
a first land selectively connecting the second port and the third port;
a second land selectively connecting the second port and the fourth port in cooperation with the first land;
a third land selectively connecting the fifth port and the sixth port;
a fourth land selectively connecting the second port and the seventh port in cooperation with the third land; and
a fifth land applied with a control pressure of the third solenoid valve, and wherein the elastic member is disposed between the first land and the valve body.

12. The hydraulic control apparatus of claim 2, wherein the fourth shift valve is formed as a spool valve having a valve body and a valve spool disposed in the valve body, and converts hydraulic communication by being controlled by an elastic force of an elastic member and a control pressure of the fourth solenoid valve applied to an opposite side of the elastic member.

13. The hydraulic control apparatus of claim 12,
wherein the valve body of the fourth shift valve includes:
a first port receiving the hydraulic pressure of the fourth solenoid valve;
a second port receiving the hydraulic pressure of a second group third hydraulic line connecting the third shift valve and the fourth shift valve;
a third port selectively supplying the hydraulic pressure of the second port to a second group seventh hydraulic line;
a fourth port selectively supplying the hydraulic pressure of the second port to a second group eighth hydraulic line;
a fifth port receiving the hydraulic pressure of a second group fifth hydraulic line connecting the third shift valve and the fourth shift valve;
a sixth port selectively supplying the hydraulic pressure of the fifth port to a second group ninth hydraulic line;
a seventh port selectively supplying the hydraulic pressure of the fifth port to a second group tenth hydraulic line; and
three exhaust ports exhausting the hydraulic pressure received through the third, fourth, sixth, and seventh ports,
wherein the valve spool of the fourth shift valve includes:
a first land selectively connecting the second port and the third port;
a second land selectively connecting the second port and the fourth port in cooperation with the first land;
a third land selectively connecting the fifth port and the sixth port;
a fourth land selectively connecting the second port and the seventh port in cooperation with the third land; and
a fifth land applied with a control pressure of the fourth solenoid valve, and
wherein the elastic member is disposed between the first land and the valve body.

14. The hydraulic control apparatus of claim 2, wherein the fifth shift valve is formed as a spool valve having a valve body and a valve spool disposed in the valve body, and converts hydraulic communication by being controlled by an elastic force of an elastic member and a control pressure of the fourth solenoid valve applied to an opposite side of the elastic member.

15. The hydraulic control apparatus of claim 14,
wherein the valve body of the fifth shift valve includes:
a first port receiving the hydraulic pressure of the fourth solenoid valve;

a second port receiving the hydraulic pressure of a second group fourth hydraulic line connecting the third shift valve and the fifth shift valve;

a third port selectively supplying the hydraulic pressure of the second port to a second group eleventh hydraulic line;

a fourth port selectively supplying the hydraulic pressure of the second port to a second group twelfth hydraulic line;

a fifth port receiving the hydraulic pressure of a second group sixth hydraulic line connecting the third shift valve and the fifth shift valve;

a sixth port selectively supplying the hydraulic pressure of the fifth port to a second group thirteenth hydraulic line;

a seventh port selectively supplying the hydraulic pressure of the fifth port to a second group fourteenth hydraulic line; and three exhaust ports exhausting the hydraulic pressure received through the third, fourth, sixth, and seventh ports, wherein the valve spool of the fifth shift valve includes:

a first land selectively connecting the second port and the third port;

a second land selectively connecting the second port and the fourth port in cooperation with the first land;

a third land selectively connecting the fifth port and the sixth port;

a fourth land selectively connecting the second port and the seventh port in cooperation with the third land; and a fifth land applied with a control pressure of the fourth solenoid valve, and wherein the elastic member is disposed between the first land and the valve body.

16. The hydraulic control apparatus of claim 1, wherein the at least three solenoid valves comprise:

a first solenoid valve connected to the first shift valve and the reducing valve and controlling the first shift valve;

a second solenoid valve connected to the second, fourth, and fifth shift valves and the reducing valve and controlling the second, fourth, and fifth shift valves; and a third solenoid valve connected to the third shift valve and the reducing valve and controlling the third shift valve.

17. The hydraulic control apparatus of claim 16, wherein the first actuator includes first and second chambers for a third speed and a first speed, respectively;

wherein the second actuator includes first and second chambers for a second speed and a fourth speed, respectively;

wherein the third actuator includes first and second chambers for a seventh speed and a fifth speed, respectively;

wherein the fourth actuator includes first and second chambers for an eighth speed and a sixth speed, respectively; and wherein the fifth actuator includes first and second chambers for a ninth forward speed and the reverse speed, respectively.

18. The hydraulic control apparatus of claim 16, wherein in a case of a failure of the first solenoid valve, a low gear driving or a high gear driving is realized by controlling the first and second actuators or the third, fourth, and fifth actuators;

in a case of a failure of the second solenoid valve, driving in the odd-numbered shifting stages or in the even-numbered shifting stages is realized by controlling the second and fourth actuators or by controlling the first and third actuators; and in a case of a failure of the third solenoid valve, driving in the odd-numbered shifting stages or in low and high gears is realized by controlling the first and second actuators or the first, second, third, and fourth actuators.

19. The hydraulic control apparatus of claim 1, wherein the at least three solenoid valves comprise:

a first solenoid valve connected to the first shift valve and the reducing valve and controlling the first shift valve;

a second solenoid valve connected to the second and third shift valves and the reducing valve and controlling the second and third shift valves; and a fourth solenoid valve connected to the fourth and fifth shift valves and the reducing valve and controlling the fourth and fifth shift valves.

20. The hydraulic control apparatus of claim 19, wherein the first actuator includes first and second chambers for a third speed and a first speed, respectively;

wherein the second actuator includes first and second chambers for a second speed and a fourth speed, respectively;

wherein the third actuator includes first and second chambers for a ninth forward speed and the reverse speed, respectively;

wherein the fourth actuator includes first and second chambers for an eighth speed and a sixth speed, respectively; and wherein the fifth actuator includes first and second chambers for a seventh speed and a fifth speed, respectively.

21. The hydraulic control apparatus of claim 19, wherein in a case of a failure of the first solenoid valve, a low gear driving or a high gear driving is realized by controlling the first and second actuators or the third, fourth, and fifth actuators;

in a case of a failure of the second solenoid valve, driving in the odd-numbered shifting stages or in the even-numbered shifting stages is realized by controlling the second and fifth actuators or the first, third, and fifth actuators; and in a case of a failure of the fourth solenoid valve, driving in the odd-numbered shifting stages or in low and high gears is realized by controlling the first and second actuators or the first, second, third, and fourth actuators.

* * * * *